United States Patent
Snider

(10) Patent No.: US 8,620,229 B2
(45) Date of Patent: Dec. 31, 2013

(54) CURRENT DRAIN IMPROVEMENTS IN TELEMATICS DEVICES USING ADJACENT CELL SIGNAL MEASUREMENT REDUCTION

(75) Inventor: James Snider, Kildeer, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 0 days.

(21) Appl. No.: 13/397,763

(22) Filed: Feb. 16, 2012

(65) Prior Publication Data

US 2013/0217384 A1     Aug. 22, 2013

(51) Int. Cl.
| | |
|---|---|
| H04B 1/034 | (2006.01) |
| H04B 17/00 | (2006.01) |
| H04B 1/60 | (2006.01) |
| H04B 1/04 | (2006.01) |
| H04M 3/42 | (2006.01) |
| H04W 4/00 | (2009.01) |
| H04B 1/38 | (2006.01) |
| H04B 7/00 | (2006.01) |

(52) U.S. Cl.
USPC ............. 455/99; 455/9; 455/67.11; 455/67.7; 455/127.5; 455/414.1; 455/434; 455/514; 455/557; 370/311; 370/328

(58) Field of Classification Search
USPC ........... 455/127.5, 434, 436, 438, 550.1, 522, 455/566.1, 514, 557, 9, 99, 67.11; 370/311, 370/328
See application file for complete search history.

(56) References Cited

U.S. PATENT DOCUMENTS

| | | | | |
|---|---|---|---|---|
| 4,352,208 | A  * | 9/1982 | Schroeder | 455/266 |
| 6,002,918 | A  * | 12/1999 | Heiman et al. | 340/7.38 |
| 8,254,858 | B2 * | 8/2012 | Tu et al. | 455/127.5 |
| 2002/0147024 | A1 | 10/2002 | Wan | |
| 2004/0204184 | A1 | 10/2004 | Lin | |
| 2008/0285494 | A1 | 11/2008 | Shin | |
| 2009/0318154 | A1* | 12/2009 | Lee et al. | 455/438 |
| 2011/0207459 | A1* | 8/2011 | Ramasamy et al. | 455/436 |

FOREIGN PATENT DOCUMENTS

| | | | |
|---|---|---|---|
| EP | 0812119 | A2 | 12/1997 |
| EP | 0812119 | A3 | 7/1999 |
| FI | EP 0812119 | * | 10/1997 |

OTHER PUBLICATIONS

Search Report dated Jul. 31, 2012, from corresponding GB Patent Application No. 1205167.8.

* cited by examiner

*Primary Examiner* — Inder Mehra

(57) ABSTRACT

The current drawn by a wireless communications device that is configured to periodically scan control channels can be reduced by reducing the number of control channels to be scanned. The relative strengths of a serving cell control channel and the relative strengths of neighboring cell control channels are determined and the scanning of neighboring cell control channels is discontinued if the communications device is not moving and the signal strength of the serving cell is above a threshold value selected to provide a signal level at which data on a control channel can be reliably recovered.

16 Claims, 5 Drawing Sheets

CURRENT DRAIN IMPROVEMENTS IN TELEMATICS DEVICES USING ADJACENT CELL SIGNAL MEASUREMENT REDUCTION

BACKGROUND

Current drain continues to be the bane of portable wireless communication devices, including so-called telematics devices that use "cellular" telephones. Telematics devices and systems are designed to monitor various sensors throughout a vehicle and to wirelessly transmit a message to a data collection center where the details of the sensed event can be acted upon. By way of example, telematics systems are able to detect a collision, determine the vehicle's location using an associated global positioning system navigation system and place a call through a cellular telephone to a telematics service provider, notifying the service provider of the collision who can then summon emergency assistance.

A problem with prior art wireless devices generally as well as prior art telematics systems is that the cellular telephone draws current from the vehicle's battery even when the vehicle is shut off. It is well known that the cellular telephone required by a telematics system will eventually deplete a vehicle's battery if it stays on after the engine is shut off. An apparatus and method that would reduce current drain, especially when the vehicle is shut off, would be an improvement over the prior art.

BRIEF SUMMARY

The current drawn by a wireless communications device that is configured to periodically scan control channels can be reduced by reducing the number of control channels to be scanned. The relative strengths of a serving cell control channel and the relative strengths of neighboring cell control channels are determined and the scanning of neighboring cell control channels is discontinued if the communications device is not moving and the signal strength of the serving cell is above a threshold value selected to provide a signal level at which data on a control channel can be reliably recovered.

BRIEF DESCRIPTION OF THE DRAWINGS

FIG. 1 is a depiction of a cellular network and the spaced-apart towers of neighboring cell sites;

FIG. 2 is a depiction of the conventional paging channels broadcast in each of three different neighboring cell sites and which are broadcast on different radio frequencies;

FIG. 3A is a depiction of the signal strength of a control channel signal sampled at discrete time intervals and depicting how the amplitude of the control channel signals might vary when the telematics cellular telephone is stationary; FIG. 3B is a depiction of how the received signal strength of a control channel decreases over time as a telematics cellular telephone moves away from a cell tower; FIG. 3C depicts how a received signal strength of a control channel might increase as the telematics cellular telephone approaches a cell tower;

FIG. 4 is a block diagram of an apparatus for reducing current drain by a wireless communications device, such as a telematics cellular telephone;

FIG. 5 is a flow chart depicting steps of a method for reducing current drain by a wireless communications device that is configured to periodically scan a control channel of a serving cell site and the control channels of several neighboring cell sites and which is also configured to determine the relative strengths of those control channel signals.

DETAILED DESCRIPTION

FIG. 1 is a depiction of a cellular communications network 100 operable with a cellular telephone 102 within a vehicle 104 and which is configured to provide telematics communications capability between the vehicle 104 and a telematics service provider not shown. The network 100 depicted in FIG. 1 is comprised of three, substantially identical towers 102 each of which has an antenna 104 from which radio frequency (RF) signals 106A, 106B and 106C of a "control channel" for each cell A, B and C, are broadcast to any cellular telephone within signal ranges of the control channel signals 106A, 106B and 106C. Signals broadcast from the cell towers provide cellular telephone service within corresponding geographic areas also denominated as A, B and C.

As used herein, "cellular" refers to wireless radiotelephone systems in which a geographical area, such as a city, is divided into small sections each of which is served by a transmitter of limited range, regardless of the frequency band and regardless of the type of modulation that might be used in such systems, and which provide wireless voice and data communications. "Cellular" thus includes so-called GSM, CDMA, TDMA, AMPS and NAMPS radio telephone communications systems. "Control channel" refers to a radio channel used by a cellular system and which is used for transmission and/or reception of management messages between a cellular communications system and one or more subscriber units that operate with a cellular communications system. Control channel messages are comprised of information in the form of data that is modulated onto or carried by a radio frequency carrier. A "radio channel" is considered to be an instance of the radio frequency spectrum used for passing information such as protocol data units (PDUs) between two or more stations (STAs). A "cell" and "cell site" are any of the small sections of a geographic area of a cellular telephone system in which cellular communications are enabled by the use of a corresponding control channel.

When the vehicle 104 is within the "A" cell, the telematics cellular telephone 102 in the vehicle 104 typically monitors the cell site control channel having the strongest signal, which is usually the control channel signals 106A broadcast from the antenna 104 on the tower 102, within the "A" cell. As is known, most cellular telephones 102 in use today monitor control channels for paging messages that are directed to the particular telematics cellular telephone 102. As is also known, the cellular telephone 102 preferably "operates" in a reduced-power, "stand-by" state wherein most of the functional electronic devices are shut off or put into a reduced power-consumption state. The cellular telephone 102 "listens" for a paging message by "waking" from a reduced power consumption, stand-by state just long enough to receive a portion of the control channel signal whereat the cellular telephone 102 expects paging messages for it, to be located in a stream of such messages on the control channel. If the cellular telephone 102 does not "hear" a paging message addressed to it, the cellular telephone 102 scans the control channels of nearby or "neighboring" towers, measures their relative amplitudes and, if none of the neighboring cell site control channel signals are stronger, the cellular telephone 102 returns to the reduced power consumption stand-by state only to re-awaken in time for the next scheduled arrival of a paging message. The cellular telephone 102 thus cycles or repeatedly transitions between two states: a reduced power stand-by state in which it cannot receive RF signals and, an "active" or powered-up state in which at least the receiver portion of the telephone 102 is fully functional.

Those of ordinary skill in the art know that when the cellular telephone 102 "wakes up" to scan its own "serving" cell control channel and additionally scan the control channels of its neighboring cells B and C, the cellular telephone 102 draws significantly more power than it draws when in it is the stand-by state. Those of ordinary skill in the art also know that the receiver portion of the cellular telephone 102 consumes power having to re-tune itself to different frequencies of different control channels 106B and 106C of neighboring cell sites B and C. Measuring or determining the relative received signal strength of those other control channels also requires power. Synchronizing the receiver to the different data streams that comprise the paging messages on each control channel also requires power. Reducing or eliminating the scans of the control channels for at least the adjacent cells would extend the life of a battery that powers the cellular telephone 102.

Figure 1:
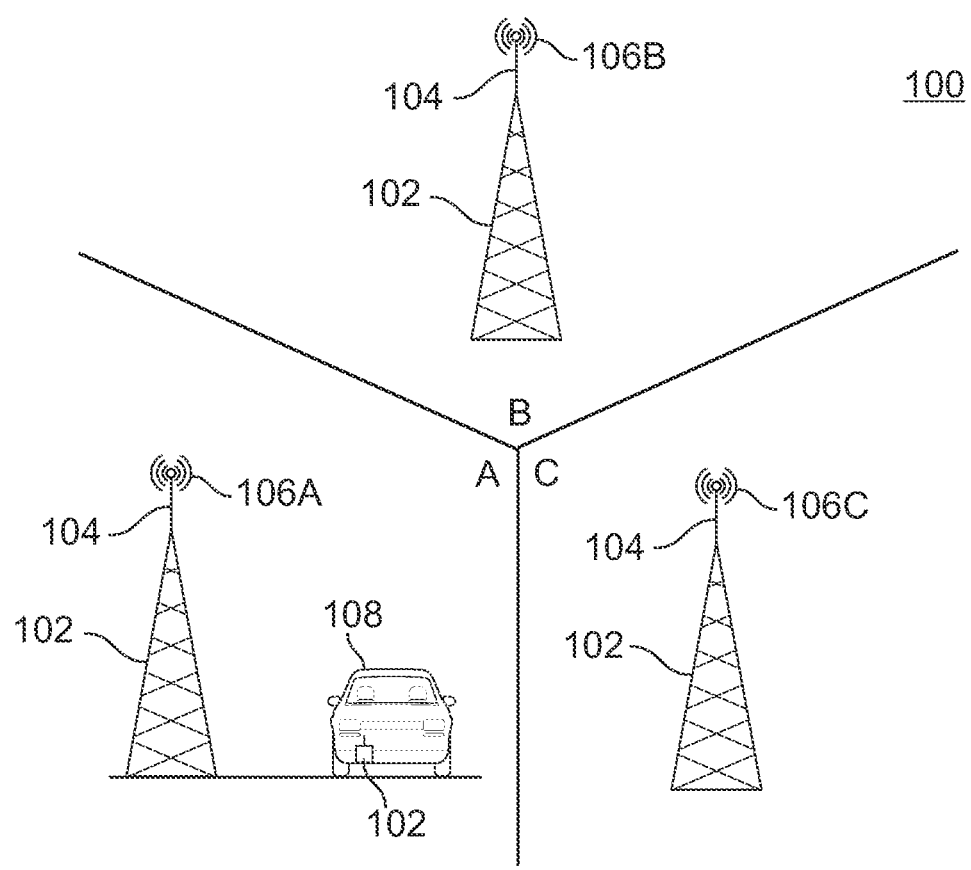
Figure 2:
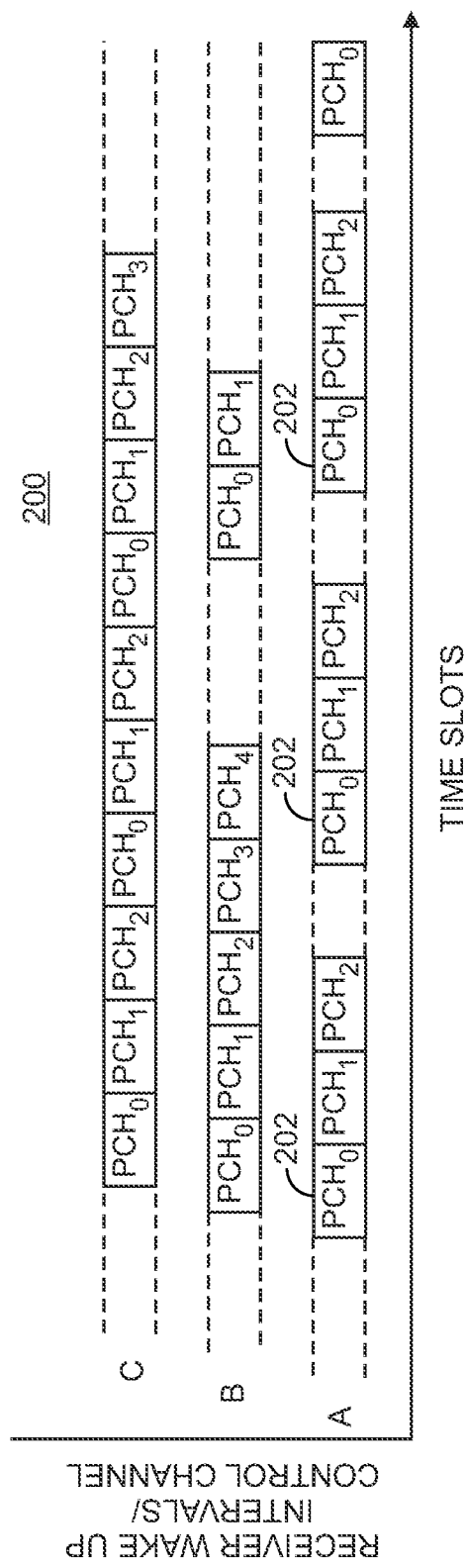

FIG. 2 is a depiction of the control channel paging messages, broadcast on the three control channels for the three cell sites A, B and C depicted in FIG. 1. The paging messages are bursts or packets of data transmitted serially and denominated in FIG. 2 as $PCH_n$. A first cellular telephone configured by the network 100 to respond to $PCH_0$ messages will awaken when the $PCH_0$ messages are scheduled to be transmitted. A second cellular telephone configured by the network 100 to respond to $PCH_1$ messages will awaken when the $PCH_1$ messages are scheduled to be transmitted. If the cellular telephone 102 in the vehicle 104 has been assigned paging slot 0, and is within cell site A, the cellular telephone 102 periodically "wakes up" to scan the serving cell control channel signal 106A, for paging messages addressed to it in paging time slot $PCH_0$. While the phone 102 is awake, it will also scan the control channels B and C to measure their signal strengths. The phone 102 might also "listen" to paging messages that might be in the $PCH_0$ time slots broadcast on those other control channels. FIG. 2 thus depicts the periodicity of the paging channel messages, which requires the cellular telephone 102 to either receive continuously and shorten battery life, or wake up periodically, i.e., when the messages are expected and return to a stand-by state if no message is received.

Figure 3A:
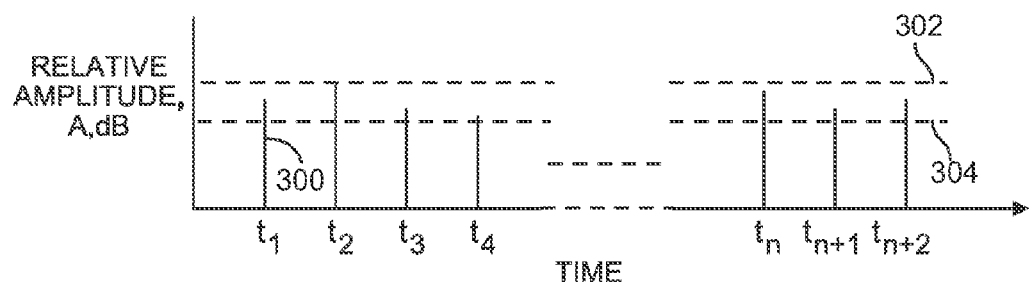

FIG. 3A depicts how the signal strength of the control channel signals are sampled at discrete intervals of time and how the relative strength of those signals might vary over time, if the cellular telephone 102 is fixed or static, i.e., stationary. The relative signal strength of control channel signals samples, is represented by the vertical height of line portions identified by reference numeral 300, which are located along the x-axis at discrete points identified as different times, $t_1, t_2, t_3 \ldots t_{n+2}$. The relative amplitudes of the control channel signal samples, which are identified hereafter by reference numeral 300, are considered to be received signal strength indicators, (RSSI) and which are obtained by the receiver portion of the cellular telephone at regular intervals.

FIG. 3A depicts how the RSSI might vary when the cellular telephone 102 is stationary. The RSSI stay within a relatively narrow amplitude variation range between an upper maximum value 302 and a lower minimum value 304. The difference in amplitude between 302 and 304 is typically quite small and less than about one or two decibels. Slight fluctuations of the measured relative signal strength or RSSI are typical.

If the control channel signal 106A of the cell site serving the cellular telephone 102 is constant or substantially constant and substantially as depicted in FIG. 3A, and has an amplitude or strength that is sufficient for the cellular telephone 102 to receive and recover information in the paging messages addressed to it, there is little or no need for the cellular telephone 102 to scan the control channels of adjacent cells because the serving cell control channel can be reliably detected. Stated another way, a constant or substantially constant RSSI of a serving cell control channel, forms at least one basis for discontinuing the scanning of neighboring cell site control channels, because the constant or substantially constant signal levels of the serving cell control channel suggests that the wireless communication device is stationary or motionless, as will happen when the vehicle 104 is turned off.

Figure 3B:
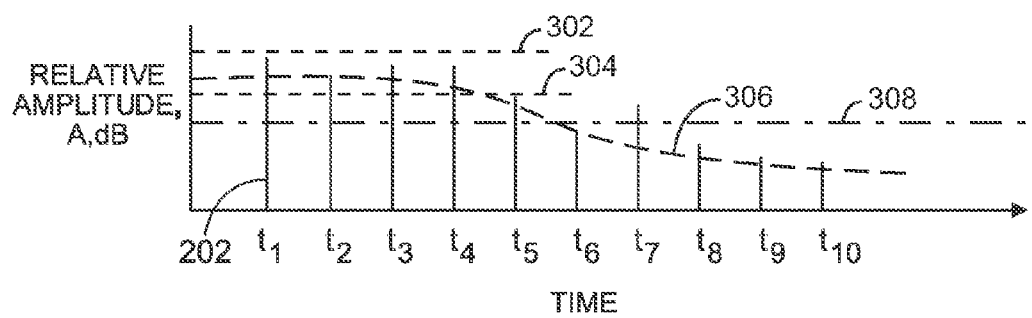

FIG. 3B depicts how the RSSI for a serving cell control channel might vary as the physical separation distance between the cellular telephone 102 and the serving cell tower 102 increases. Over time, the RSSI will decrease in amplitude. The average of the RSSI samples taken over any given time period will also decrease, which is depicted by the broken line identified by reference numeral 306: it steadily decreases until it is below a level 308 at which the receiver portion of the cellular telephone 102 can reliably detect the control channel signal 106A and paging messages 202 that are addressed to the device 102. If the cellular telephone 102 has stopped the scanning of neighboring cell site control channels 106B and 106C because of a previously constant or relatively constant RSSI signal level of its own serving cell control channel, the cellular telephone 102 is configured to detect the RSSI decrease below a threshold value 308 and resume the scanning of control channels of neighboring cell sites in order to locate a stronger or the strongest control channel signal of the neighboring cell sites.

Figure 3C:
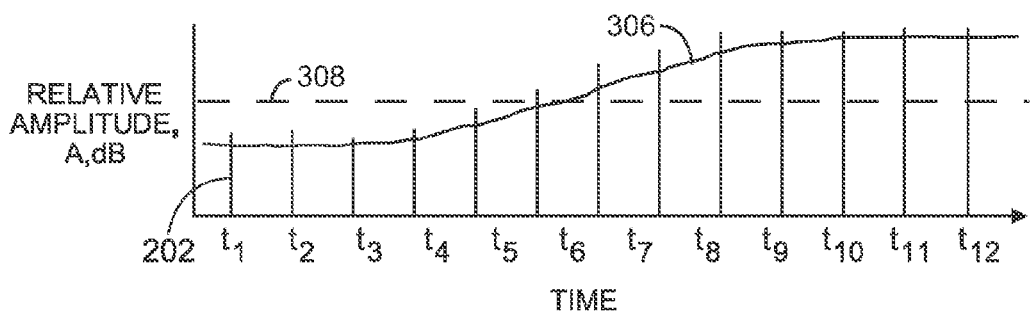

FIG. 3C is a depiction of how the RSSI of a control channel signal 106 might increase as the cellular telephone 102 approaches a cell tower. As the cellular telephone 102 approaches a tower 102 the average signal strength 306 will increase and eventually rise above the minimum received signal strength value 308 required to reliably receive information on the control channel. When the cellular telephone 102 has located a better, i.e., stronger control channel signal 106, it will thereafter "register" with the new cell site, which thereafter becomes the serving cell for the cellular telephone.

Figure 4:
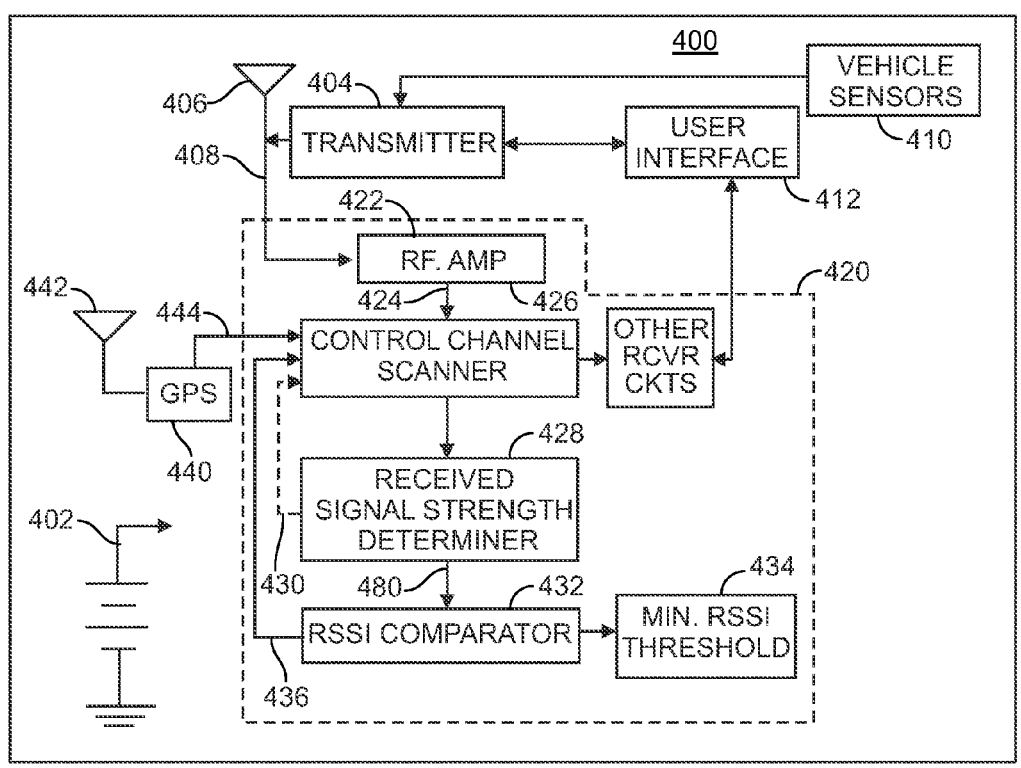

FIG. 4 depicts a cellular telephone 400 that is provided with an apparatus for reducing current drain by the cellular telephone from a battery 402. The telephone 400 is capable of providing telematics communications to a vehicle. It is comprised of a conventional cellular telephone transmitter 404 coupled to a conventional antenna 406 by a conventional transmission line 408. The transmitter 404 generates and broadcasts information that it receives from either vehicle sensors 410, omitted for brevity, or from a conventional user interface 412 such as a microphone speaker or ear piece, also omitted for brevity.

The cellular telephone 400 is also comprised of a receiver portion 420. As depicted in the figure, the receiver portion 420 is comprised of a conventional RF amplifier 422, which detects the relatively weak RF signals picked up by the antenna 406, amplifies those signals and provides them to a control channel scanner 426.

The control channel scanner 426 is comprised of circuitry and/or one or more processing devices configured to receive the radio frequency output signals 424 from the RF amplifier 422 and "scan" control channels of neighboring, i.e., nearby, cell sites. As used herein, the term "scan" is used to refer to a systematic examination of different control channels, i.e., the systematic tuning of the device to different radio frequencies on which different control channel information is transmitted.

The control channel scanner 426 is thus capable of being tuned to different radio frequency channels, which are themselves discrete portions of the RF spectrum in which information is transmitted, and to recover information on each of those channels. Stated another way, the control channel scanner 426 is tunable and is tuned to the radio frequencies for cell site control channels.

The control channel scanner 426 sequentially tunes itself to the control channel of a first cell site for a period long enough to recover the control signal and long enough to have a measurement of the relative amplitude of the control channel signal performed by a received signal strength determiner 428. The control channel scanner thereafter re-tunes itself to a different frequency, every time a control channel is to be evaluated. It stays tuned to each control channel frequency, for a period of time, long enough to recover the control channel signal at the second frequency and the information carried thereon. The control channel signal scanner thus repeatedly and sequentially scans or is tuned to several different control channel frequencies for time periods long enough for the device to measure relative signal strengths on each frequency and report those signal strengths to a received signal strength determiner 428.

A received signal strength determiner 428 receives from the control channel scanner 426, the radio frequency signal on each of the control channels that the control channel scanner 426 tunes to. The received signal strength determiner 428 thereafter determines the relative signal strength of each control channel signal provided to it by the control channel scanner 426. The received signal strength determiner 428 outputs a received signal strength indicator or RSSI, which has or is comprised of a value corresponding to a relative strength of a signal received on a frequency to which the control channel scanner 426 was tuned and which was received at the antenna 406 of the cellular telephone 400. Stated another way, the received signal strength determiner measures the strength of signals it receives and provides an indication of those measured signal strengths. The control channel scanner 426 and the received signal strength determiner 428 are thus configured to provide a series of signal strength measurements for each of the control channels of the serving cell and adjacent cells.

In one embodiment, the received signal strength determiner 428 provides a stop scanning output signal 430 to the control channel scanner 426 and which causes the control channel scanner 426 to halt its scanning of control channels. In such an embodiment, the stop scanning signal is activated when the received signal strength determiner 428 has evaluated the serving cell control channel signal and determined that its strength is adequate for operation of the cellular telephone 400 such that no further scanning of adjacent cell site control channels is necessary thereby reducing the amount of current drawn by the battery 402.

In another embodiment, the received signal strength determined 428 outputs the RSSI values 430 to an RSSI comparator 432. The RSSI comparator 432 compares the magnitude of the received signal strength on each control channel to a minimum RSSI threshold value stored in a register 434. If the measured RSSI value exceeds the minimum RSSI threshold 434 an output signal 436 from the comparator 432 causes the control channel scanner 426 to output its own stop scanning signal 436, thereby reducing the amount of current drawn by the battery 402.

In a preferred embodiment, the stop scanning signal 436 provided by the RSSI comparator 422 to the control channel scanner 426 is activated when the control channel scanner 426 is first tuned to the serving cell control channel and thereafter tuned to the control channels of adjacent cells. If the RSSI of a neighboring cell sites is weaker than the RSSI of the serving cell site, the control channel scanner 426 is configured to stop scanning the control channels of neighboring cells. In such a preferred embodiment, the control channel scanner 426 will not scan any control channel of a neighboring or adjacent cell site the amplitude or level of which is less than the serving cell site control channel signal level or below a threshold below which data on the control channel signal is not recoverable. Stated another way, the control channel scanner 426 will discontinue scanning control channels of adjacent cells, the RSSI of which are determined from at least one scan or evaluation of them, to be insufficient and therefore not warranting repetitive sampling of their signal strengths. Stopping the scans of adjacent cell site control channels reduces the power drawn by the cellular telephone 400 by a battery 402.

Still referring to FIG. 4, the cellular telephone 400 is provided with a conventional global positioning system or GPS, receiver 440. The GPS receiver 440 receives signals from a corresponding antenna 442 and provides location data 444 to the control channel scanner 426. In another embodiment, the control channel scanner 426 is configured to cease scanning control channels of neighboring cells, when the cellular telephone 400 is not moving, i.e., it is stationary. Once the vehicle 104 has stopped moving, there is no reason for the control channel scanner 426 to continue scanning control channel frequencies used by adjacent cell sites if the amplitude of the serving cell site is at least adequate for the cellular telephone 400 to maintain communications with a telematics service provider. The determination of whether the cellular telephone 400 is stationary is a relatively straightforward matter, best accomplished by a processor evaluating successive locations output from the GPS 440 over time.

Figure 5:
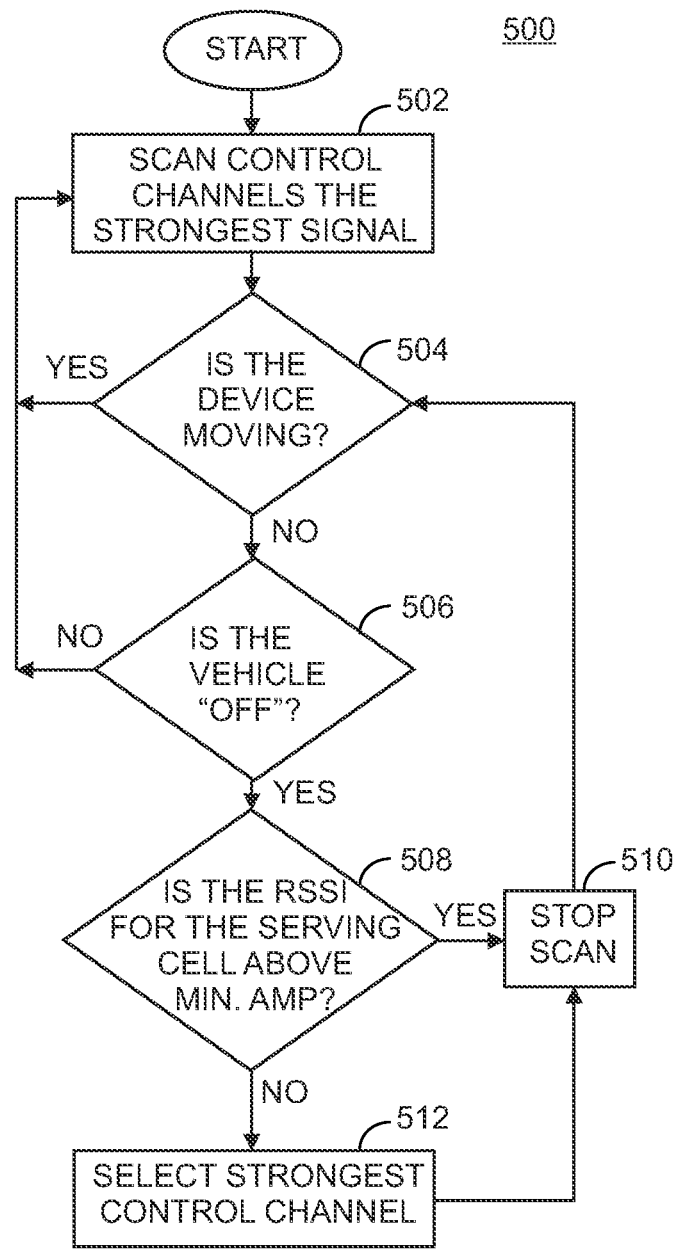

FIG. 5 depicts steps of at least one method 500 for reducing current drain by a wireless communications device, such as the cellular telephone 400 depicted in FIG. 4.

In a first step 502, such as when the cellular telephone is powered up, all of the control channels "heard" by the receiver portion of the cellular telephone are scanned to select the strongest-available control channel signal. After a control channel signal is selected and the cellular telephone has registered with the corresponding cell site, at step 504, the method 500 checks whether the cellular telephone or a vehicle to which it is attached is moving. If the vehicle is moving, the method 500 continues to scan control channels normally due to the fact that the amplitude of the serving cell site control channel might vary as depicted in FIGS. 3B and 3C. If a vehicle is moving, the engine is presumably running and keeping the battery charged. Under such a condition, the need to maintain reliable communications with a telematics service provider supersedes the need to reduce current draw by the cellular telephone.

If the vehicle has stopped moving, as determined in step 504 a second test is performed at step 506 to determine whether or not the vehicle 504 is in an "off" state. An "off" state exists if an ignition switch or other form of on/off switch is in a state that deactivates the vehicle, e.g., turns off the engine.

If the vehicle is not off but is instead stopped and "idling," the battery will typically continue to be charged by the vehicle's engine, obviating the need to reduce power consumption. The method thus returns to step 502 whereat the control channels are scanned. On the other hand, if the vehicle is determined to be in an off state, another test is made at step 508 to determine whether the RSSI for the serving cell site is above a minimum of amplitude level. If the RSSI for the serving cell site is above an empirically or experimentally determined amplitude level, the scans of adjacent cell control channels are stopped at step 510 in order to reduce the current drawn by the cellular telephone from a battery 410 that provides power to the cellular telephone. Once the scanning of adjacent cell site control channels is stopped, power drawn from a battery powering the telematics cellular telephone is significantly reduced. Returning to step 502, via the "no" branch, from 506 when the vehicle is not "off" may be done for vehicles powered by an internal combustion engine. If the vehicle is: (1) an electric vehicle (e.g., a vehicle that uses one or more electric motors or traction motors for propulsion), (2) not moving, and (3) not turned "off," then the "yes" branch from 506 may be followed. In this way, current consumption savings provided by steps 508 and 510 may result in improved vehicle battery life under circumstances in which there is no gasoline powered alternator, for example, to recharge the vehicle's battery.

If at step 508 it is determined that the RSSI for the serving cell site is below a minimum usable amplitude, the method 500 selects the strongest available control channel at step 512 and thereafter stops scanning other adjacent control channel signals.

The foregoing description is for purposes of illustration only. The true scope of the invention is set forth in the appurtenant claims.

The invention claimed is:

1. A method of reducing current drain by a vehicular wireless communications device, which is powered by a vehicle battery, the battery capable of being charged by the vehicle, the wireless communications device being configured to periodically scan a serving cell control channel and control channels of a plurality of neighboring cells, and configured to determine the relative strengths of the serving cell control channel and the relative strengths of neighboring cell control channels, the method comprising:

discontinuing scanning of the neighboring cell control channels, when the vehicle is not charging the vehicle battery and the serving cell control channel signal level is above a threshold.

2. The method of claim 1, wherein the vehicle has an engine-driven battery charging device and wherein the step of discontinuing scanning comprises discontinuing scanning if the engine is off.

3. The method of claim 1, wherein the wireless communications device is coupled to an electric vehicle and the step of discontinuing scanning occurs when the vehicle is in an off state.

4. The method of claim 1, wherein the wireless communications device is a telematics cellular telephone and wherein the step of discontinuing scanning comprises discontinuing scanning of control channels after the occurrence of a collision, which stops the charging of the vehicle's battery.

5. The method of claim 1, further comprising the step of:
resuming scanning of the neighboring cell control channels upon a decrease in signal level of the serving cell control channel below a threshold level.

6. The method of claim 5, wherein the decrease is below a predetermined value of about three decibels.

7. A method of reducing current drain by a wireless communications device within a vehicle and powered by a vehicle battery capable of being charged by the vehicle, the wireless communications device being configured to periodically scan a serving cell control channel, control channels of a plurality of neighboring cells and configured to determine the relative strengths of the serving cell control channel and the neighboring cell control channels, the method comprising:

determining a level of a signal on the serving cell control channel signal;

if the serving cell control channel signal level is above a threshold and if the vehicle is not charging the vehicle battery, discontinuing scanning of the neighboring cell control channels.

8. The method of claim 7, wherein the threshold is a predetermined received signal strength level.

9. An apparatus for reducing current drain by a wireless communications device within a vehicle and which is powered by a vehicle battery, the battery capable of being charged by the vehicle, the wireless communications devices being configured to periodically scan a serving cell control channel and control channels of a plurality of neighboring cells, and configured to determine the relative strengths of the serving cell control channel and the relative strengths of neighboring cell control channels, the apparatus comprising:

a control channel scanner configured to selectively scan a plurality of control channels and to recover a signal on each control channel to which the control channel scanner is tuned, the control channel scanner scanning only the serving cell control channel responsive to receipt of a control channel signal level indicator and a determination that the vehicle is not charging the vehicle battery and that the service cell control channel signal level is greater than a threshold value; and a received signal strength determiner (determiner) coupled to the control channel scanner and configured to provide a received signal strength indicator (RSSI) to the control channel scanner, the RSSI having a value corresponding to a strength of a signal received on a control channel, to which the control channel scanner is tuned.

10. The apparatus of claim 9, further comprising an RSSI comparator coupled to the determiner and configured to compare an RSSI value received from the determiner to a threshold value, and to provide to the determiner, a signal indicating whether the received RSSI is above or below the threshold value.

11. The apparatus of claim 9, wherein the control channel scanner is additionally configured to scan only the service cell control channel if the apparatus is stationary, the apparatus further comprising: a navigation system configured to determine whether the apparatus is moving or stationary and to provide to the control channel scanner, a signal indicating that the apparatus is stationary.

12. The apparatus of claim 9, further comprised of a motor vehicle controller configured to determine whether the motor vehicle is in an off state, wherein the control channel scanner is additionally configured to scan only the service cell control channel if the vehicle is in an off state.

13. The apparatus of claim 9, wherein the control channel scanner is additionally configured to periodically discontinuing scanning of control channels of neighboring cells having a control channel signal strength within a predetermined range.

14. The apparatus of claim 9, wherein the control channel scanner is additionally configured to resume scanning neighboring cell control channels upon a decrease in signal level of the serving cell control channel.

15. The method of claim 14, wherein the decrease is about three decibels (dB).

16. The apparatus of claim 9, wherein the determiner is comprised of a processor and a memory device coupled to the processor and which stores program instructions, which when executed cause the processor to provide the received signal strength indicator (RSSI) to the control channel scanner.

* * * * *